(12) United States Patent
Kohgo et al.

(10) Patent No.: US 8,637,154 B2
(45) Date of Patent: Jan. 28, 2014

(54) CERAMIC BEADS WITH SMOOTH SURFACES AND PROCESS FOR PRODUCING THE SAME

(75) Inventors: Masanori Kohgo, Kanagawa (JP); Koyata Takahashi, Kanagawa (JP)

(73) Assignee: Tosoh Corporation, Yamaguchi (JP)

( * ) Notice: Subject to any disclaimer, the term of this patent is extended or adjusted under 35 U.S.C. 154(b) by 171 days.

(21) Appl. No.: 13/133,304

(22) PCT Filed: Dec. 8, 2009

(86) PCT No.: PCT/JP2009/070504
§ 371 (c)(1),
(2), (4) Date: Jun. 7, 2011

(87) PCT Pub. No.: WO2010/067782
PCT Pub. Date: Jun. 17, 2010

(65) Prior Publication Data
US 2011/0244239 A1   Oct. 6, 2011

(30) Foreign Application Priority Data

Dec. 11, 2008 (JP) ................................ 2008-316211
Feb. 10, 2009 (JP) ................................ 2009-028151
Aug. 31, 2009 (JP) ................................ 2009-199874

(51) Int. Cl.
*B32B 5/16* (2006.01)
(52) U.S. Cl.
USPC ........................................................ 428/402
(58) Field of Classification Search
USPC ........................................................ 428/402
See application file for complete search history.

(56) References Cited

U.S. PATENT DOCUMENTS

| 6,696,376 | B2 | 2/2004 | Niwa et al. |
| 7,081,290 | B2 | 7/2006 | Takahashi et al. |
| 7,749,674 | B2 * | 7/2010 | Sugiura et al. ............ 430/137.16 |
| 7,931,836 | B2 | 4/2011 | Xie et al. |
| 8,039,065 | B2 * | 10/2011 | Ikeda et al. ................... 428/1.32 |
| 8,043,780 | B2 * | 10/2011 | Sugiura et al. ............. 430/110.3 |
| 8,404,411 | B2 * | 3/2013 | Mitsumori et al. ........ 430/58.45 |
| 2007/0110655 | A1 | 5/2007 | Xie et al. |

FOREIGN PATENT DOCUMENTS

| CN | 1421278 | A | 6/2003 |
| CN | 1587062 | A | 3/2005 |
| GB | 2355947 | A | 5/2001 |
| JP | 46-002174 | B1 | 1/1971 |
| JP | 63-250401 | A | 10/1988 |
| JP | 02-203932 | A | 8/1990 |
| JP | 06-025717 | A | 2/1994 |
| JP | 06-108221 | A | 4/1994 |
| JP | 06-183833 | A | 7/1994 |
| JP | 06-287012 | A | 10/1994 |
| JP | 09-110517 | A | 4/1997 |
| JP | 2707528 | B2 | 1/1998 |
| JP | 2001-039773 | A | 2/2001 |
| JP | 2001-294483 | A | 10/2001 |
| JP | 2002-346377 | A | 12/2002 |
| JP | 2004-142996 | A | 5/2004 |
| JP | 2007-112707 | A | 5/2007 |
| JP | 2009-173461 | * | 8/2009 |
| JP | 2009-173461 | A | 8/2009 |

OTHER PUBLICATIONS

International Search Report of PCT/JP2009/070504, date of mailing Mar. 16, 2010.
Translation of the International Preliminary Report on Patentability (PCT/IB/373) (1 page), (PCT/ISA/237) (6 pages) of International Application No. PCT/JP2009/070504 dated Jul. 5, 2011.
Japanese Office Action dated May 21, 2013, issued in corresponding Japanese Patent Application No. 2009-274354, with English translation (6 pages).
Chinese Office Action issued Apr. 11, 2013, issued in corresponding Chinese Patent Application No. 200980149562. X; w/English translation (15 pages).
Office Action dated Sep. 2, 2013, issued in corresponding Chinese application No. 200980149562.X, with English translation.

* cited by examiner

*Primary Examiner* — Leszek Kiliman
(74) *Attorney, Agent, or Firm* — Westerman, Hattori, Daniels & Adrian, LLP

(57) ABSTRACT

A subject for the invention is to provide a process for ceramic bead production in which ceramic beads with smooth surfaces are obtained by a simpler method without using a complicated process involving, for example, a DC plasma/radio-frequency plasma combination or a two-stage radio-frequency plasma. Another subject is to provide such ceramic beads. The invention relates to a technique in which a preheated raw ceramic material is introduced into a laminar-flow thermal plasma obtained using a high-voltage type direct-current (DC) plasma gun and is cooled and solidified and the resultant ceramic beads are collected. It is preferred that the raw ceramic material should be preheated by passing the raw material through a refractory tube which runs through a furnace, while sending the raw ceramic material with a carrier gas, and that the preheated raw-material powder should be introduced into and treated with the thermal plasma under such conditions that the resultant ceramic beads are discharged from the thermal plasma at a discharge angle of 60° or larger with the thermal plasma. Thus, satisfactory ceramic beads which have smooth surfaces and have few crack defects and few internal void defects are obtained.

5 Claims, 8 Drawing Sheets

CERAMIC BEADS WITH SMOOTH SURFACES AND PROCESS FOR PRODUCING THE SAME

TECHNICAL FIELD

The present invention relates to ceramic beads suitable for use in, for example, bead mills, and to a process for producing the ceramic beads.

BACKGROUND ART

A bead mill method is known as a technique for mixing and/or disaggregating a fine ceramic powder (see, for example, patent document 1). Beads for use in bead mills are required to have high wear resistance in order to minimize contamination caused by the bead material as a result of bead wear (see, for example, patent documents 2 and 3).

A technique for producing a spherical powder using a thermal plasma has been disclosed as one method for enhancing the wear resistance of beads (see, for example, patent documents 4 and 5). In such techniques for producing a spherical powder using a thermal plasma, a radio-frequency plasma is in main use because the plasma is generated in a wide region (see, for example, patent documents 5, 6, and 7). In the radio-frequency plasma method, particles which have passed through a high-temperature region melt in the thermal plasma and become highly spherical powder particles. However, this method has had a problem that particles distributed in the region which surrounds the thermal plasma and through which a sheath gas is flowing remain unmelted and come to coexist as particles having low wear resistance. Consequently, investigations are being made, for example, on a method in which a raw-material powder is introduced into a direct-current (DC) arc plasma and blown off while being melted and the powder is thereby led to the high-temperature portion of a radio-frequency plasma (see, for example, patent document 4) and on a method in which a radio-frequency plasma is arranged in two stages (see, for example, patent document 5). However, these methods not only involve a complicated process but also have had a drawback that when the raw-material powder has pores therein, the particles burst upon melting or voids are formed through melting, which constitutes an obstacle that makes it difficult to sufficiently round the particles.

PRIOR-ART DOCUMENTS

Patent Documents

Patent Document 1: JP-A-2001-39773
Patent Document 2: Japanese Patent No. 2707528
Patent Document 3: JP-A-06-183833
Patent Document 4: JP-A-63-250401
Patent Document 5: JP-A-06-287012
Patent Document 6: JP-A-06-025717
Patent Document 7: JP-A-2002-346377

SUMMARY OF THE INVENTION

Problems that the Invention is to Solve

The invention, which has been achieved in view of the problems described above, relates to ceramic beads that contain few burst particles and have few voids and that have smooth surfaces, and to a process for easily producing such ceramic beads using a direct-current (DC) thermal plasma.

Means for Solving the Problems

The present inventors diligently made investigations in order to overcome the problems described above. As a result, the inventors have found that ceramic beads which have a satisfactory spherical shape that has been unobtainable so far and which have smooth surfaces can be produced using a method in which a DC plasma gun is used to generate a laminar-flow thermal plasma and a powder of a raw ceramic material is introduced into the plasma, by preheating the raw-material powder while sending the powder with a carrier gas, introducing the preheated powder into the thermal plasma from a powder feed port to cause the raw-material powder to cross the thermal plasma while melting the surface of the powder, subsequently cooling and solidifying the particles, and collecting the solidified particles with a collection vessel. The invention has been thus completed.

Namely, essential points of the invention reside in the following (1) to (14).

(1) Zirconia beads characterized by having a surface roughness (Ra) as measured with an AFM (atomic force microscope) of 3.0 nm or less.

(2) The zirconia beads according to (1), preferably characterized by having a monoclinic-crystal content less than 1% and a surface roughness (Ry) as measured with a scanning laser microscope of 0.3 μm or less.

(3) The zirconia beads according to (1) or (2), preferably characterized by having a monoclinic-crystal content of 10% or less after having been treated at 130-135° C. and a relative humidity of 100% for 12 hours.

(4) The zirconia beads according to any one of (1) to (3), preferably characterized by having an internal void ratio of 10% or less.

(5) The zirconia beads according to any one of (1) to (4), preferably characterized by having an average roundness of particle diameter of 2.0 μm or less.

(6) The zirconia beads according to any one of (1) to (5), preferably characterized in that the average peak height from a complete circle calculated from the roundness and a least-square center is 0.4 μm or less and the average number of peaks observed above the complete circle is 2.2 or less.

(7) A process for producing ceramic beads which comprises introducing a raw ceramic material into a thermal plasma formed with a high-voltage type direct-current (DC) plasma gun to melt the raw ceramic material and then cooling and solidifying the molten particles, characterized in that the thermal plasma forms a laminar flow and that the raw ceramic material in a preheated state is introduced into the thermal plasma from a powder feed port.

(8) The process for producing ceramic beads according to (7), preferably characterized in that the preheated raw ceramic material is introduced so as to cross the thermal plasma.

(9) The process for producing ceramic beads according to (7) or (8), preferably characterized in that ceramic beads are discharged at an angle of 60° or larger with the traveling direction of the thermal plasma.

(10) The process for producing ceramic beads according to any one of (7) to (9), preferably characterized in that the raw ceramic material is preheated by passing the raw ceramic material through a refractory tube which runs through a furnace, while sending the raw ceramic material with a carrier gas.

(11) The process for producing ceramic beads according to (10), preferably characterized in that the refractory tube is made of a material which is any one of quartz glass, mullite, alumina, and zirconia.
(12) The process for producing ceramic beads according to any one of (7) to (11), preferably characterized in that the powder feed port is located outside the DC plasma gun.
(13) The process for producing ceramic beads according to any one of (7) to (12), preferably characterized in that ceramic beads are collected within water.
(14) The process for producing ceramic beads according to any one of (7) to (13), preferably characterized in that the raw ceramic material is zirconia.

Effects of the Invention

According to the invention, spherical ceramic beads with smooth surfaces are easily obtained from a raw-material ceramic powder. Furthermore, even when the raw-material powder has pores therein, the powder particles are less apt to burst. Consequently, ceramic beads of a satisfactory shape can be efficiently obtained in high yield.

MODES FOR CARRYING OUT THE INVENTION

Figure 1:
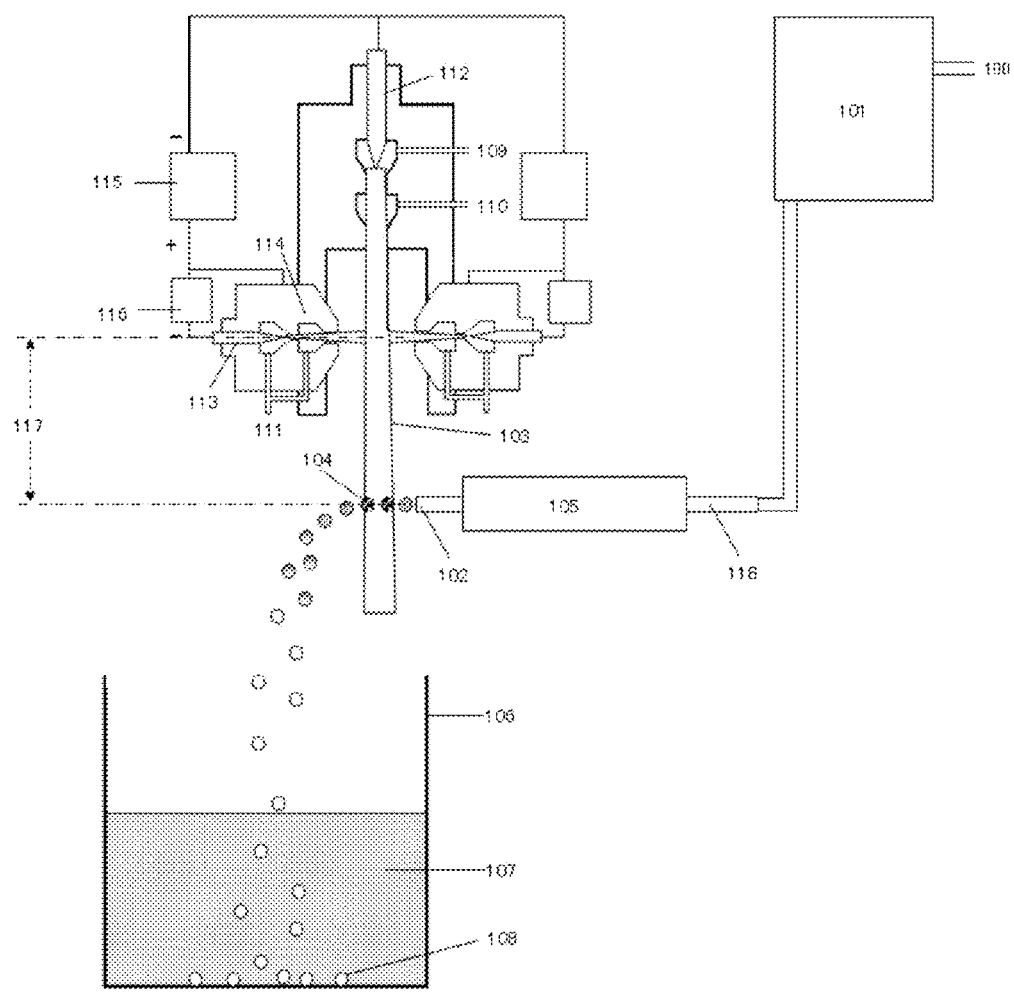
FIG. 1 is a diagrammatic view illustrating one embodiment of the invention.

The zirconia beads of the invention are explained below in detail.
The zirconia beads of the invention have a surface roughness (Ra) as measured with an AFM (atomic force microscope) (the surface roughness being hereinafter referred to as Ra(AFM)) of 3.0 nm or less. In the case where the zirconia beads have an Ra(AFM) exceeding 3.0 nm, the surfaces thereof are rough and are apt to be abraded. Such beads hence have reduced wear resistance.
Incidentally, Ra(AFM) is a value expressed by center-line surface roughness, center-line mean roughness, etc., and is a value determined by the method according to JIS (B0601-2001).
The zirconia beads of the invention are spheres. It is therefore preferred that a range far smaller than the diameter of the bead should be examined with an AFM and the inclination and curvature be corrected to determine Ra(AFM) regarding line roughness or area roughness. A preferred range of examination is as follows. When line roughness is to be measured, the range of examination preferably is a length which is 1/10 to 1/30 the average particle diameter. When area roughness is to be measured, the range of examination preferably is a square area having sides each having a length which is 1/10 to 1/30 the average particle diameter.

It is preferred that the zirconia beads of the invention should have a monoclinic-crystal content less than 1%. It is preferred that the zirconia beads should have substantially no monoclinic crystals. In the case where the monoclinic-crystal content thereof is 1% or more, the beads contain monoclinic crystals in too high a proportion and are apt to undergo a phase transition when used as a pulverization medium or the like. Consequently, such particles are apt to become brittle.

It is preferred that the zirconia beads of the invention should have a surface roughness (Ry) as measured with a scanning laser microscope of 0.30 μm or less. In the case where the zirconia beads have a surface roughness (Ry) exceeding 0.30 μm, the surfaces thereof are too rough and are apt to be abraded. Such beads hence have reduced wear resistance. It is more preferred that the surface roughness (Ry) thereof should be 0.25 μm or less.

Incidentally, the surface roughness (Ry) is a value expressed by Rmax, area roughness, maximum height, etc., and is a value determined by the method according to JIS (B0601-2001).

However, since the beads are spheres, it is preferred that a range far smaller than the diameter of the bead should be examined with a scanning laser microscope and the inclination and curvature be corrected to determine Ry regarding line roughness or area roughness. A preferred range of examination is as follows. When line roughness is to be measured, the range of examination preferably is a length which is 1/10 to 1/30 the average particle diameter. When area roughness is to be measured, the range of examination preferably is a square area having sides each having a length which is 1/10 to 1/30 the average particle diameter.

Furthermore, it is preferred that the surface roughness Ra of the zirconia beads of the invention as measured with a scanning laser microscope should be 0.04 μm or less. In the case where the zirconia beads have a surface roughness Ra exceeding 0.04 μm, the surfaces thereof are too rough and are apt to be abraded. Such beads hence have reduced wear resistance.

Incidentally, Ra is a value expressed by center-line surface roughness, center-line mean roughness, etc., and is a value determined by the method according to JIS (B0601-2001). Ra can be calculated from a line roughness or area roughness measured with a scanning laser microscope or the like.

It is preferred that the zirconia beads of the invention should have a monoclinic-crystal content of 10% or less after having undergone a hydrothermal degradation test conducted at 130-135° C. and a relative humidity of 100% for 12 hours. Beads which, after the hydrothermal degradation test, have a monoclinic-crystal content exceeding 10% have poor stability when used as a pulverization medium or the like, and are apt to be broken or destroyed during use. Such beads hence decrease in mixing and/or disaggregating performance.

It is preferred that the zirconia beads of the invention should have an internal void ratio of 10% or less. In the case where the internal void ratio thereof exceeds 10%, the zirconia beads have reduced strength and are apt to be broken or destroyed. Such beads hence decrease in mixing and/or disaggregating performance. The term internal void ratio means the content of voids of 5 μm or larger.

It is preferred that the zirconia beads of the invention should have an average value of roundness of particle diameter (hereinafter referred to as average roundness) of 2.0 μm or less. The average roundness thereof is especially preferably 1.9 μm or less. Furthermore, it is preferred that the average of peak heights from a complete circle (hereinafter referred to as average peak height) should be 0.4 μm or less and that the average number of peaks observed above the complete circle (hereinafter referred to as average number of peaks) should be 2.2 or less. Beads in which the average peak height and the average number of peaks exceed those values have a deformed shape. When such beads are used, for example, as the pulverization medium of a bead mill, the beads are rubbed against one another at increased frequency, resulting in enhanced generation of impurities. The roundness of zirconia beads can be determined by the method according to JIS (B7451).

It is preferred that the zirconia beads of the invention should have a particle density as provided for in JIS (R1620) of 6.00 g/cm$^3$ or higher. The particle density thereof is especially preferably 6.05 g/cm$^3$ or higher, more preferably 6.10 g/cm$^3$ or higher. In the case where the zirconia beads have a particle density less than 6.00 g/cm$^3$, voids and low-density defects are present in an increased amount within the beads. Such beads are hence apt to be broken or destroyed when used as a pulverization medium or the like.

It is preferred that the zirconia beads of the invention should have an average particle diameter of 10 μm to 200 μm. In the case where beads having an average particle diameter less than 10 μm are used, for example, as the pulverization medium of a bead mill, a longer period is required for mixing and/or disaggregating a fine ceramic powder, resulting in a decrease in pulverization efficiency. On the other hand, beads having a particle diameter exceeding 200 μm are too large, making it difficult to mix and/or disaggregate a fine ceramic powder. From the standpoint of satisfactorily mixing and/or disaggregating a fine ceramic powder, the average particle diameter of the zirconia beads of the invention is preferably 10 μm to 100 μm, especially preferably 10 μm to 80 μm.

It is preferred that the zirconia beads should be uniform in particle diameter. From this standpoint, the standard deviation of particle diameter is preferably less than 4.0 μm, especially preferably 3.5 μm or less.

It is preferred that the zirconia beads of the invention should be partially stabilized zirconia and should contain yttria.

Zirconia beads are apt to have a structure in which the internal crystals are oriented in different directions, i.e., the so-called domain structure (twin structure). Although details thereof are unclear, that structure is characteristic of ceramic beads which have undergone a plasma treatment, and is thought to be generated by rapidly cooling ceramic powders which are in the state of being melted by a plasma. Consequently, a domain structure cannot be observed in ceramic beads which have not undergone a plasma treatment, e.g., zirconia beads which have undergone mechanical polishing only.

The production process of the invention is explained below in detail.

The process for ceramic bead production of the invention is a process for producing ceramic beads which comprises introducing a raw ceramic material into a thermal plasma formed with a DC plasma gun to melt the raw ceramic material and then cooling and solidifying the molten particles, and is characterized in that the thermal plasma forms a laminar flow and that the raw ceramic material in a preheated state is introduced into the thermal plasma from a powder feed port which is substantially perpendicular to the thermal plasma.

FIG. 1 diagrammatically illustrates a process of the invention for producing ceramic beads.

The term laminar flow as used in the invention means that the gas flow in that region of the thermal plasma in which a powder of a raw ceramic material (hereinafter referred to as "raw-material powder") is melted has stream lines which are always parallel to the axis of the wall of the apparatus (reaction tube). In general, the flow rate becomes lower toward the wall of the apparatus (reaction tube) and is highest at the center of the apparatus, and a flow rate distribution is apt to result. Such a distribution generates when the fluid receives frictional force from the wall of the tube. In the case where a turbulent flow generators, eddies of various sizes ranging from big to small ones generate to form a vigorous flow.

The DC plasma gun to be used in the invention can be a general high-voltage type DC plasma gun. For example, APS 7050, manufactured by Aeroplasma Limited Company, or the like can be used.

In the process of the invention, it is essential that the thermal plasma should be in a laminar-flow state. By using a high-voltage type DC plasma gun and by regulating the flow rate of the plasma gas so as to be low, a plasma jet having a laminar flow can be obtained. The plasma in this state has a length as large as 15-50 cm in the air.

It is preferred that the DC plasma gun to be used in the invention should be of a high-voltage type. Such a high-voltage type DC plasma gun has a plasma voltage during thermal spraying of 100 V or higher, especially preferably 100-250 V, in contrast to the plasma voltage during thermal spraying of 30-80 V for ordinary DC plasma guns. Such a high voltage can be obtained by prolonging the distance between the cathode and the anode.

Gas flow rates for obtaining a laminar flow in the invention vary depending on the size of the apparatus. However, it is preferred that the flow rate of argon gas (sum of 109 and 111 in FIG. 1) should be reduced to, for example, 10 SLM or less and the flow rate of nitrogen plasma gas (110 in FIG. 1) should be reduced to, for example, 10 SLM or less.

Usually, reducing the flow rate of a plasma gas to a small value results in a decrease in the cooling effect of the plasma gas and hence in a decrease in electrode life. However, in a high-voltage type DC plasma gun, since the plasma current for obtaining the same electric power is low, reducing the flow rate of a plasma gas exerts a limited influence on the electrode life and a laminar-flow thermal plasma is obtained even in the air.

Examples of methods for generating a laminar-flow thermal plasma in the invention include the following. For example, in FIG. 1, argon gas 109 is first caused to flow on the cathode 112 side, and a cathode-side thermal plasma is generated by means of a plasma power supply 115. Next, argon gas 111 is caused to flow on the anode 114 side, and an anode-side thermal plasma is generated by means of an auxiliary power supply 116. Furthermore, a plasma gas 110 such as nitrogen, air, argon, hydrogen, or the like is caused to flow to connect the cathode-side thermal plasma to the anode-side thermal plasma and thereby generate a thermal plasma necessary for melting a raw material.

In the case where APS 7050 is used as the DC plasma gun to generate a laminar-flow thermal plasma, preferred conditions include an argon gas 109 flow rate of 3 SLM or less, an argon gas 111 flow rate of 3 SLM or less, and a flow rate of the plasma gas 110 which is nitrogen of 7 SLM or less. For the purpose of enhancing thermal power, hydrogen gas may be added.

The atmosphere in the reaction tube for generating a thermal plasma is not particularly limited, and an oxygen atmosphere, an inert atmosphere, the air, or the like is applicable. The air suffices.

In the invention, a preheated raw-material powder is introduced into a thermal plasma.

Methods for preheating a raw-material powder and introducing the preheated powder into a thermal plasma are not limited so long as the raw-material powder is preheated to a given temperature when introduced into a thermal plasma. For example, in FIG. 1, a raw-material powder is heated by passing the powder through a refractory tube 118 which runs through an electric, gas, infrared, or another furnace 105, and the heated powder is introduced into a thermal plasma 103 from a powder feed port 102 made of the same refractory material.

It is preferred that the material of the refractory tube should be quartz glass, mullite, alumina, or zirconia. It is especially preferred to use quartz glass, which is less apt to generate impurities.

The temperature to which the raw-material powder is to be preheated is preferably 400° C. or higher, especially 500° C. or higher, more preferably 800° C. or higher. In the case where the preheating temperature is lower than 400° C., it is difficult to relieve the thermal shock which the raw-material powder receives when abruptly heated by the thermal plasma. The ceramic beads thus obtained are apt to have surface cracks. When used in bead mills, such ceramic beads are apt to have reduced strength and to have reduced wear resistance because of the surface irregularities thereof. On the other hand, so long as the preheating temperature is 500° C. or higher, the thermal shock can be further relieved and, hence, ceramic beads suitable for bead mills can be obtained. This effect is remarkable when the preheating temperature is 800° C. or higher.

There is no particular upper limit on the preheating temperature. It is, however, preferred to use a preheating temperature which does not exceed the temperature of the thermal plasma into which the raw-material powder is to be introduced. In the case where the preheating temperature is too high, the raw-material powder is in an excessively heated state just before being introduced into the thermal plasma and, hence, heating and melting by the thermal plasma are insufficient.

Furthermore, it is preferred that when the preheated raw-material powder according to the invention is introduced into a thermal plasma, the raw-material powder should be introduced so as to cross the thermal plasma. By introducing the raw-material powder into a thermal plasma which is forming a laminar flow and by causing the introduced powder to cross the thermal plasma, the raw-material powder can be instantaneously heated and melted and the surfaces thereof can be smoothed. In addition, the period over which the raw-material powder is heated can be regulated more delicately, and the raw-material powder can be prevented from being excessively melted.

In the invention, in the case where the raw-material powder is caused to cross a thermal plasma, the raw-material powder which has been heated and melted can be easily discharged from the thermal plasma. Consequently, gas blowing for cutting the thermal plasma is not essential in this case.

Methods for introducing the raw-material powder so as to cross the thermal plasma in the invention are not particularly limited. It is, however, preferred to introduce the raw-material powder from a powder feed port which is disposed in the vicinity of the thermal plasma substantially perpendicularly thereto.

The term "substantially perpendicularly" is used here for expressing the angle which is necessary for the introduced raw-material powder to cross the thermal plasma, i.e., the angle at which the raw-material powder is introduced so as to transverse the direction of the laminar flow which is being formed by the thermal plasma. This angle cannot be unconditionally specified because the angle varies depending on the state of the thermal plasma. For example, in FIG. 1, a laminar-flow thermal plasma 103 is vertically ejected downward, and a powder feed port 102 is disposed horizontally to introduce a raw-material powder into the plasma. However, use may be made of a configuration in which a laminar-flow thermal plasma 103 is ejected in a horizontal direction and a powder feed port 102 is vertically disposed downward to introduce a raw-material powder into the plasma. Alternatively, conditions including angled arrangements may be used. It is important to employ an angle which enables a raw-material powder to cross a thermal plasma.

In the invention, it is preferred that the discharge angle at which ceramic beads that have crossed a thermal plasma are discharged is 60° or larger with respect to the traveling direction of the thermal plasma. More preferably, the discharge angle is 70° or larger.

In the case where the discharge angle is smaller than 60°, the raw-material powder resides in the thermal plasma over a longer period. As a result, the particles are apt to burst, or defective ceramic beads such as ceramic beads having voids therein are apt to be formed. The ceramic beads thus obtained have reduced wear resistance. Even when a raw-material ceramic powder is introduced from a direction perpendicular (90°) to the traveling direction of the thermal plasma, the discharge angle of the resultant ceramic beads is 90° at the most because the vector of the raw-material powder is inclined to the traveling direction of the thermal plasma.

The term discharge angle herein means the angle between the direction in which the raw-material powder is discharged after crossing the thermal plasma and the traveling direction of the thermal plasma, and is an angle which can be measured from the traveling direction of the thermal plasma and the loci of the ceramic beads which are being discharged.

Figure 7:
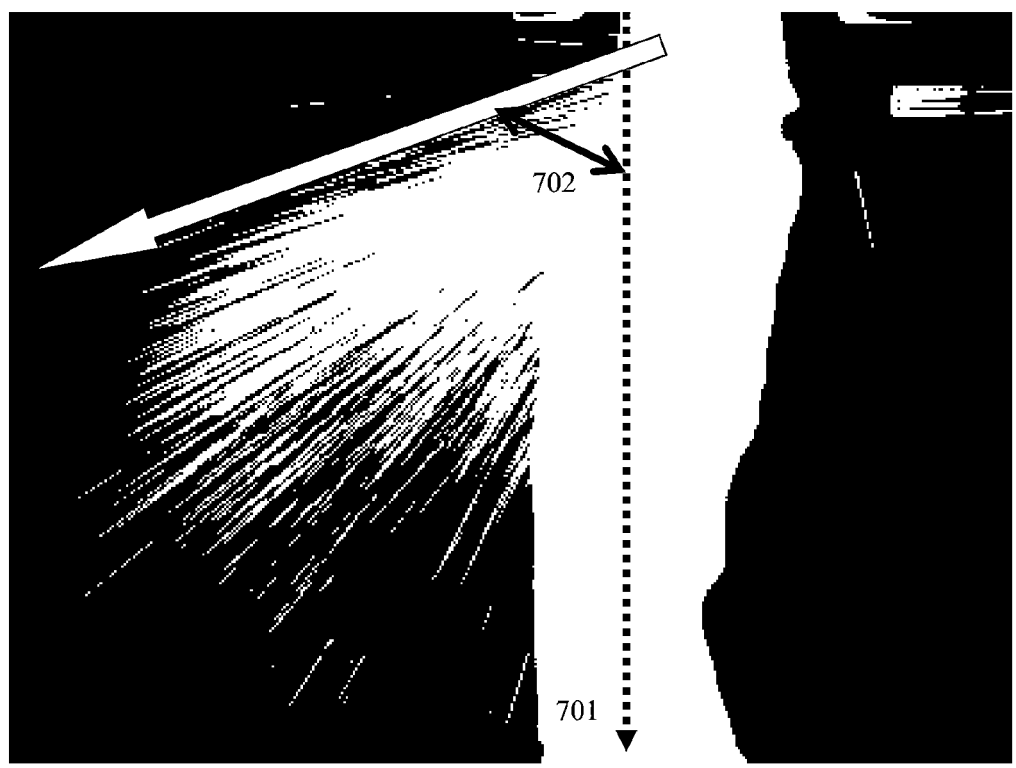
FIG. 7 is a view illustrating an example of a discharge angle measurement.

The traveling direction of the thermal plasma and the loci of the ceramic beads which are being discharged can be determined from a captured image, e.g., a photograph. It is preferred to use a captured image showing raw-material powder particles being discharged, an image obtained by binarizing the captured image, or the like. In FIG. 7, the thermal plasma (701) constitutes a laminar flow along the direction indicated by the arrow. The angle between the traveling direction of the laminar flow and a direction parallel thereto is taken as 0°, and the angle (702) between that direction and the direction in which the raw-material powder is discharged after crossing the thermal plasma is the discharge angle.

With respect to angles at which a raw material is introduced into a plasma, techniques have hitherto been investigated in which a raw material is introduced at a perpendicular angle or at an angle within the range of ±45° based on that direction (for example, patent document 6). However, these techniques are intended to increase throughput or to prolong the period of residence in the plasma, and the material to be treated is supplied to the tail flame region. In contrast, the factor which is specified in the invention is the angle at which the raw material is discharged. In the process of the invention, the discharge angle means that the raw-material powder which has been supplied passes through the high-temperature plasma in a short period and is thereby treated with the plasma, and that the material being treated is prevented from residing in the tail flame for a prolonged period.

It is preferred in the invention that the position of the powder feed port should be located in the vicinity of the thermal plasma and outside the DC plasma gun main body. This position prevents the raw-material powder from residing within the DC plasma gun or prevents the raw-material powder which has resided in the gun from coming into the plasma again, and the apparatus can hence be stably operated while avoiding contamination.

The distance (117 in FIG. 1) from the position where a thermal plasma generates to the powder feed port is preferably in the range of 5 to 10 cm. By regulating this distance, heating can be controlled accurately.

It is preferred that when a preheated raw-material powder is to be introduced into a thermal plasma in the invention, the raw-material powder should be introduced by sending the raw-material powder with a carrier gas. For example, in FIG. 1, a raw material powder is charged into a powder feeder 101, conveyed to the powder feed port 102 with a carrier gas 100, and introduced into a laminar-flow thermal plasma 103 from the powder feed port 102.

As the carrier gas, use can be made of the gas of argon, nitrogen, helium, or air.

The flow rate of the carrier gas is preferably 50-400 m/sec, more preferably 80-250 m/sec, in terms of the flow rate of the carrier gas ejected from the powder feed port. In the case where the flow rate thereof is lower than 50 m/sec, clogging is apt to occur in the tube for supplying the raw-material powder. In the case where the flow rate thereof exceeds 400 m/sec, heating of the raw-material powder is insufficient. In contrast, so long as the flow rate of the carrier gas is 80-250 m/sec, almost no problems arise with respect to clogging within the tube and insufficient heating.

Incidentally, the flow rate of a carrier gas is drawn using the following equation (1):

$$X=(X1\times10^6/60)\times(X2+273)/(293\times3.14\times X3^2/4)/1000 \quad (1)$$

wherein X is the flow rate of the carrier gas (m/sec); $X1$ is carrier feed rate (L/min); $X2$ is preheating temperature (°C.); and $X3$ is the inner diameter of the tube for sending the raw-material powder (mm).

Furthermore, the numerals 273, 293, and 3.14 in equation (1) mean absolute temperature (K), ordinary temperature (K), and the ratio of the circumference of a circle to the diameter thereof, respectively.

Consequently, when, for example, a carrier gas is supplied at a rate of 8 L/min into a tube having an inner diameter of 2 mm and heated at 800° C., then the flow rate of the carrier gas is about 160 m/sec.

In the invention, the raw-material powder which has crossed the thermal plasma is in the state of a molten powder, and this molten powder is cooled and solidified and is then collected as ceramic beads.

In the invention, the molten powder discharged from the thermal plasma may, as it is, be allowed to fall naturally. As a result, the molten powder cools and solidifies, and ceramic beads with smooth surfaces can be obtained. In the case where ceramic beads are to be collected through natural falling, it is preferred that the distance from the powder feed port to the bottom of the collection vessel should be 30 cm to 100 cm. In the case where the distance is shorter than 30 cm, cooling is insufficient to pose a problem concerning overheating. Distances longer than 100 cm result in a decrease in collection efficiency.

For collecting ceramic beads according to the invention, it is preferred to use a method in which the shock that the ceramic beads receive upon falling is relieved. Especially preferred is a method in which the ceramic beads are collected by allowing the ceramic beads to fall into water. By thus relieving the shock of collection, the ceramic beads formed can be prevented from breaking.

The amount of water necessary for the collection depends on the size and weight of the beads. However, an amount capable of relieving the shock which the ceramic beads receive upon falling may suffice. For example, in the case of batch processing, it is preferred to use water in such an amount that after all ceramic beads have been collected, the water surface is above the collected ceramic beads. In the case of continuous processing, running water may be introduced into and discharged from a collection vessel to continuously take out the ceramic beads.

Furthermore, in the method for collecting ceramic beads according to the invention, it is preferred to collect only the ceramic beads which have crossed the thermal plasma. In the case where part of the raw-material powder which has been introduced into the thermal plasma accompanies the laminar flow of the thermal plasma and melts, without crossing the thermal plasma, these raw-material powder particles reside in the thermal plasma for a longer period and this is apt to result in failures such as broken particles and ceramic beads having voids therein. Such particles have low wear resistance, and it is preferred that the collected ceramic beads should not contain such particles.

Examples of methods for collecting only the ceramic beads which have crossed the thermal plasma include a technique in which a collection vessel is disposed on the opposite side of the center of the thermal plasma from the powder feed port. For example, in FIG. 1, a collection vessel 106 is disposed on the opposite side of the center of the thermal plasma 103 from the powder feed port 102. By thus disposing a collection vessel, only the satisfactory ceramic beads which have crossed the thermal plasma can be collected.

It is preferred that the collection vessel should have heat resistance and be made of stainless steel. It is also preferred that the surface of the collection vessel should have been coated with a resin from the standpoint of preventing the yielded ceramic beads from adhering to the collection vessel.

According to the process of the invention, ceramic beads each having a spherical shape and a smooth surface can be produced.

The material of the ceramic beads to be produced by the invention can be any oxide material. Examples thereof include alumina, zirconia, silica, mullite, yttria, and barium titanate. It is especially preferred that the material should be zirconia. In the case where ceramic beads for use in bead mills are to be produced, it is preferred to employ a ceramic having the same composition as the material to be pulverized or to employ a material which is hard and is less apt to break, such as partially stabilized zirconia.

It is preferred that the powder for use as a raw material for the ceramic beads to be produced by the invention should be a powder obtained by granulating a powder of a ceramic. Methods for granulation are not particularly limited. However, a granulation method suitable for producing a spherical powder, such as spray drying, in-liquid granulation, rolling granulation, or the like, is preferred.

In the case where a ceramic material having a relatively low melting point, such as alumina, silica, or mullite, is to be used as a raw-material powder, it is possible to employ a powder obtained by pulverizing masses of the ceramic.

The diameter of the powder for use as a raw material for the ceramic beads to be produced by the invention depends on the diameter of the ceramic beads to be finally produced. However, it is possible to use a raw-material powder having a diameter of about 10 μm to 200 μm.

EXAMPLES

The invention will be explained below in detail by reference to Examples and Comparative Examples, but the invention should not be construed as being limited to the Examples.

The ceramic beads obtained in the invention were subjected to the following evaluation.

(Determination of Internal Void Ratio)

Internal void ratio was determined through an SEM examination of sections of ceramic beads. In the SEM examination of a section, holes of 5 μm or larger were regarded as voids and the proportion in which voids were present was taken as internal void ratio. Four hundred particles were examined for determining the internal void ratio.

(Calculation of Proportion of Smooth Beads)

The proportion of smooth beads was calculated through an SEM examination of the surfaces of ceramic beads. In the SEM examination of the surfaces, the beads having surfaces which remained unmelted and the beads having surfaces which had not been sufficiently melted and had not been smoothed were regarded as defectives. The proportion of such defective beads was subtracted from the proportion of all ceramic beads examined, and the resultant value was taken as the proportion of smooth beads. A hundred particles were examined for calculating the proportion of smooth beads.

(Evaluation of Wear Characteristics)

Ceramic beads produced were evaluated for wear characteristics using a batch bead mill device (Type RMB-01, manufactured by AIMEX Co., Ltd.). A hundred and ten grams of the ceramic beads obtained and 45 cc of pure water were introduced into a mill container made of zirconia which had a capacity of 100 cc and was capable of being regulated so as to have a temperature of 18° C., and the contents were stirred for 30 hours at a stirring speed of 2,000 rpm.

After the stirring, the ceramic beads were removed, and the residual stirring liquid was recovered and examined by inductively coupled plasma emission spectrometry (hereinafter referred to as "ICP") to determine the amount of zirconia present in the stirring liquid.

(Hydrothermal Degradation Test)

In a hydrothermal degradation test, a pressure cooker (TPC-212M, manufactured by TABAI ESPEC Corp.) was used to treat zirconia beads under the conditions of 132° C., a relative humidity of 100%, and 12 hours. The pressure during the treatment was 1.7-2.0 MPa, and the accuracy of temperature and humidity control was 3%.

(Determination of Monoclinic-Crystal Content)

Zirconia beads were examined by X-ray powder diffractometry (XRD), and the peaks appearing at 2θ=28.2°, 30.2°, and 31.2° on the resultant diffraction chart were regarded as assigned to monoclinic crystals and tetragonal crystals. Furthermore, the area of each peak was calculated, and the content of monoclinic crystals was calculated using the following equation.

$$\text{Monoclinic-crystal content} = \frac{Sm(\bar{1}11) + Sm(111)}{Sm(\bar{1}11) + St, c(101) + Sm(111)} \quad [\text{Math. 1}]$$

$Sm(\bar{1}11)$: area of monoclinic-crystal peak($2\theta = 28.2°$)

$St, c(101)$: area of tetragonal-crystal peak($2\theta = 30.2°$)

$Sm(111)$: area of monoclinic-crystal peak($2\theta = 31.2°$)

(Determination of Average Particle Diameter)

Determination was made in the following manner. Photographs having a magnification of 500 diameters which had been obtained in an SEM examination were subjected to image analysis using NanoHunter NS2K-Pro, manufactured by Nanosystem Corp. The bright and dark parts of each captured image were binarized to separate the image into bead parts and a base part.

In the binarization, bead parts which had a color brighter or darker than the base part constituting the background of the image were extracted, and the extracted parts and the background were separately shown using white and black. The binarization was conducted by a method in which the whole image was equally binarized using a given degree of brightness as a threshold value.

For the purpose of eliminating fluctuations of measured values to attain accurate evaluation, beads were photographed with a scanning microscope at given intervals within a predetermined range, and the bead images were collected. The number of beads examined was about 50; incomplete bead images, i.e., incomplete bead images located at edges and incomplete bead images due to bead overlapping, were removed and complete bead images only were subjected to image analysis.

After the image analysis, the average diameter of the beads was determined. In the determination, the bead parts obtained by the binarization were separated as circles, and the diameter of each of the separated circles was determined to obtain the average particle diameter of the beads.

(Measurement of Particle Density)

Particle density was measured by the pycnometer method as provided for in JIS (R1620). The mass of a measuring vessel was expressed by $m_{P1}$, and the mass of this vessel into which beads had been placed was expressed by $m_{P2}$. Subsequently, ethanol was introduced thereinto as an immersion liquid so that the beads were wholly immersed. This vessel was placed in a vacuum vessel to conduct degassing. Ethanol was additionally introduced into the degassed vessel to a given amount, and the mass of this vessel was expressed by $m_{P3}$. Furthermore, the beads and the ethanol were taken out of the vessel, and ethanol only was introduced into the vessel to the given amount. The mass of the vessel in this state was expressed by $m_{P4}$. A specific gravimeter and a thermometer were used to calculate the specific gravity $\rho_L$ of the ethanol, and the particle density was calculated using the following equation.

$$\text{Particle density} = \frac{(m_{p2} - m_{p1})\rho_L}{(m_{p4} - m_{p1}) - (m_{p3} - m_{p2})} \quad [\text{Math. 2}]$$

(Determination of Average Roundness, Average Peak Height, and Average Number of Peaks)

Roundness was determined using the image analysis software in accordance with JIS (B7451) in the following manner. A least-square center was first determined from data on the circumference of one binarized bead, and the difference between maximum and minimum radii, with respect to the least-square center, of the roundness curve was taken as the roundness. Furthermore, a circle corresponding to the least-square center and having a diameter determined from the roundness was taken as a complete circle, the regions where the data on the bead circumference exceeded the complete circle were defined as peaks. The heights and the number of the peaks of each bead were determined. Twenty or more beads were examined, and the averages for these beads were taken as the average roundness, average height of peaks, and average number of peaks.

(Measurement of Surface Roughness)

The surface roughness Ra and Ry of beads was determined with a scanning laser microscope (VK-8500, manufactured by Keyence Corp.) by the method according to JIS (B0601-2001). Specifically, a bead sample was scattered on and fixed to a tape, and an area including the top of each sample bead was examined. With respect to a central area of the top, processing for removing the spherical inclination and curvature of the bead was conducted, and the area roughness of an area 3 μm square was thereafter calculated. An average line of the resultant roughness curve was drawn, and the absolute values of deviation of the curve from the average line were summed up and averaged with respect to an area having a sampling length (3 μm) in the direction of the average line. This average value was taken as Ra. Furthermore, the sum of the height of a highest peak from the average line and the depth of a deepest valley from the average line was taken as Ry. Twenty or more beads were examined in order to eliminate fluctuations of measured values, and average values thereof were determined. Surface roughness (Ra(AFM)) determined with an AFM (atomic force microscope) was calculated in the same manner as for the Ra determined with a scanning laser microscope, except that an examination was made with an AFM (atomic force microscope; NanoScope Ma, manufactured by Veeco Inc.) as an examination apparatus.

(Measurement of Discharge Angle)

The loci of ceramic beads which were being discharged after having been formed from a raw-material powder which crossed a thermal plasma were photographed, and the discharge angle was measured on the resultant image.

The image used for the measurement was obtained by photographing, at a shutter speed of 1 msec, the ceramic beads being discharged from a thermal plasma. Since the loci of the ceramic beads being discharged were distributed in a certain range, the angle between the locus having a largest angle with the laminar-flow thermal plasma and the traveling direction of the thermal plasma was measured and taken as the discharge angle.

An example of the measurement of discharge angle is shown in FIG. 7. In each of the Examples and Comparative Examples, an average of values obtained from eight such drawings was taken as the discharge angle.

Example 1

Ceramic beads were produced using the apparatus configuration shown in FIG. 1.

An yttria-containing (3% by mole) partially stabilized zirconia powder which had an average particle diameter of 50 μm and which had been obtained through granulation by an in-liquid granulation method and through sintering was introduced as a raw material into the powder feeder 101. A laminar-flow thermal plasma was generated while feeding argon gas 109, argon gas 111, and a plasma gas 110 composed of nitrogen and 20% hydrogen added thereto, at rates of 3.0 SLM, 2 SLM, and 6 SLM, respectively, and supplying an electric power at 24 kW (160 V×150 A).

Subsequently, the raw-material powder was supplied with a carrier gas 100, which was nitrogen introduced at 6 SLM, by means of the powder feed 101 at a rate of 20 g/min into a quartz pipe 118 having an inner diameter of 2 mm disposed in a tubular electric furnace 105 having a length of 1 m and having a temperature regulated to 1,000° C. The heated raw-material powder was conveyed to the powder feed port 102 disposed so that the distance 117 from the plasma generation position was 8 cm, and the raw-material powder was introduced into the laminar-flow plasma 103 so as to cross the plasma 103 and was thereby melted. The flow rate of the carrier gas was estimated at 140 msec using equation (1).

The raw-material powder which had been introduced so as to cross the thermal plasma was discharged therefrom and became a molten particle 104, and the molten particle discharged from the thermal plasma, as such, was allowed to fall naturally. The discharge angle of this molten particle was 72°. The molten particle 104 discharged was collected with a stainless-steel vessel 106 which had a diameter of 45 cm and a depth of 15 cm and in which pure water had been placed to a depth of 10 cm. The distance between the position where the raw-material powder was introduced and the bottom of the collection vessel was 50 cm.

The powder was supplied for 10 minutes in the manner described above, and the partially stabilized zirconia beads thus obtained were taken out by filtration and dried.

Figure 2:
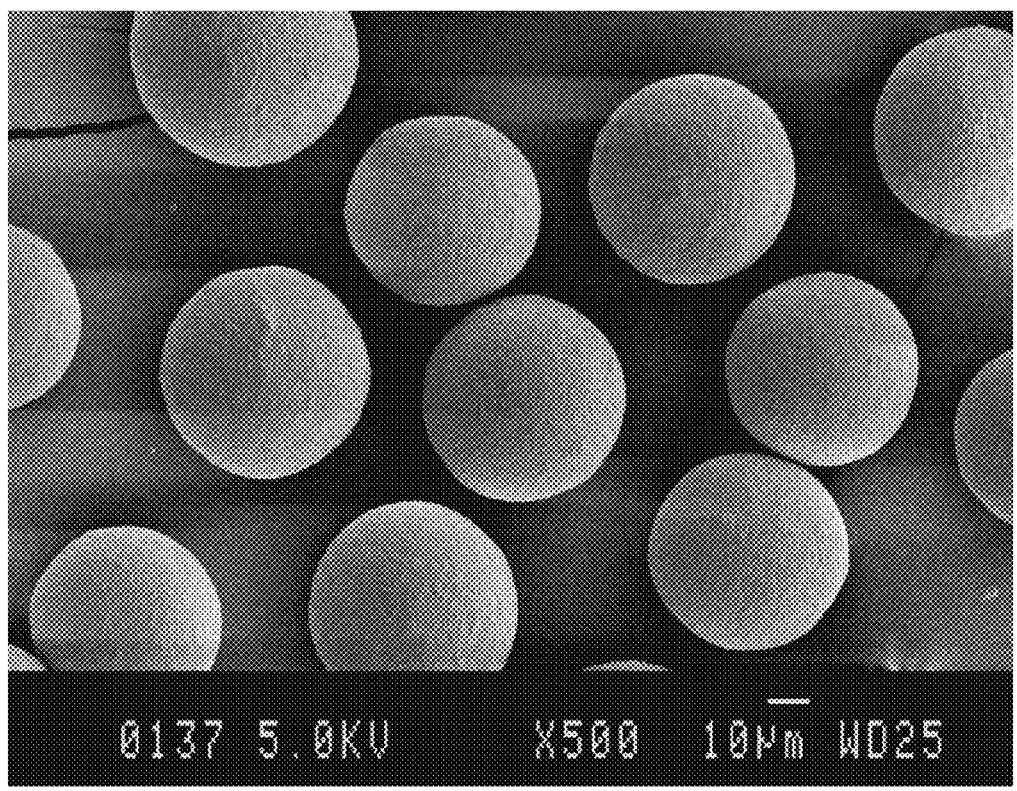
FIG. 2 is a view showing an example of the raw material used in Example 1.
Figure 3:
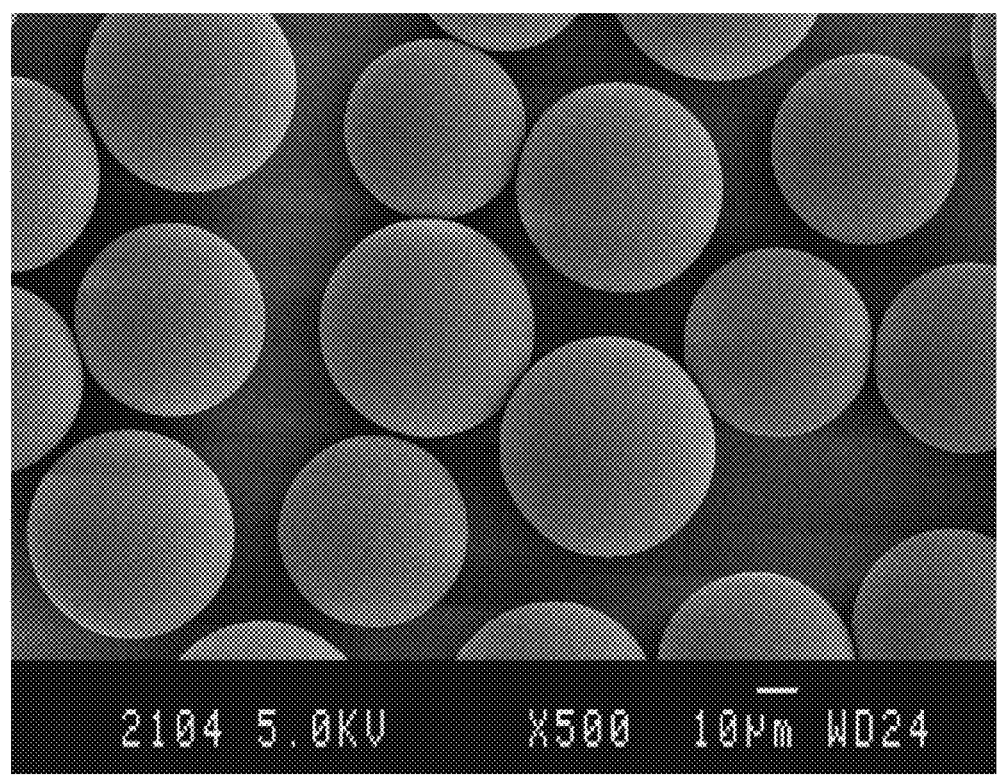
FIG. 3 is a view showing the partially stabilized zirconia beads produced in Example 1.
Figure 4:
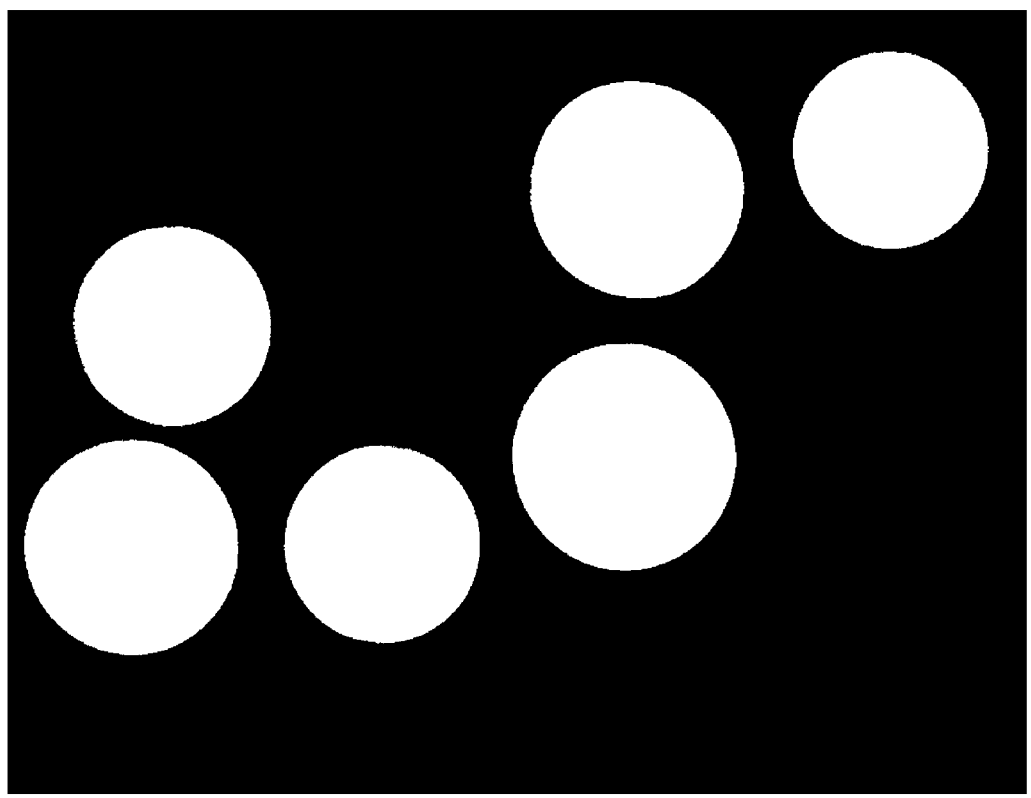
FIG. 4 is a view obtained by binarizing FIG. 3.
Figure 5:
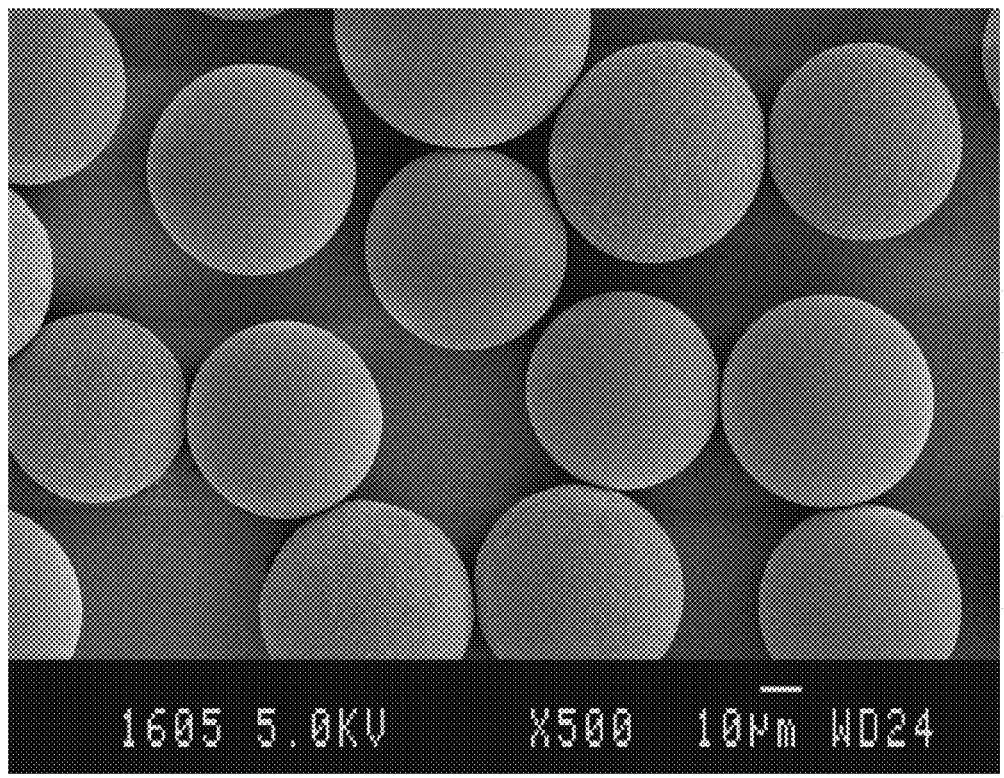
FIG. 5 is a view showing the partially stabilized zirconia beads produced in Example 6.

The surfaces and sections of the partially stabilized zirconia beads obtained were examined with an SEM. In FIG. 2 is shown a view illustrating the surfaces of particles of the raw-material powder. In FIG. 3 is shown a view illustrating the surfaces of some of the partially stabilized zirconia beads obtained through melting. A view obtained by binarizing FIG. 3 is shown in FIG. 4.

The raw-material powder was composed of powder particles having a distorted spherical shape, and fine grains were observed on the surfaces thereof. Most of the fine grains on the bead surfaces had disappeared as a result of melting and the surfaces had been smoothed. A more even spherical shape was thus obtained, and the proportion of smooth beads was 95% or higher. Neither surface crack defects nor bead breakage both attributable to a thermal shock was observed. The internal void ratio was 2%. Furthermore, the beads were evaluated for wear characteristics and, as a result, the amount of zirconia was found to be 0.1 ppm, which was a detection limit.

The partially stabilized zirconia beads had an average particle diameter of 50 μm (standard deviation, 3.7 μm) and a particle density of 6.10 g/cm$^3$. The beads had an average roundness of 1.7 μm, an average peak height of 0.39 μm, and an average number of peaks of 2.0. With respect to the surface roughness of the bead surfaces, the Ra and the Ry, both determined through an examination with a scanning laser microscope, were 0.02 μm and 0.16 μm, respectively, and the Ra(AFM), determined through an examination with an AFM, was 2.0 nm. Furthermore, the zirconia beads had a monoclinic-crystal content of 0%, and the monoclinic-crystal content thereof after the hydrothermal degradation test was 8%.

Example 2

The powder was supplied for 10 minutes under the same conditions as in Example 1, except that the nitrogen carrier gas 100 was introduced at 4 SLM. The flow rate of the carrier gas being ejected in this operation was estimated at 90 m/sec using equation (1), and the discharge angle was 71°. The partially stabilized zirconia beads obtained were taken out by filtration and dried.

The surfaces and sections of the partially stabilized zirconia beads obtained were examined with an SEM. As a result, it was found that most of the fine grains on the bead surfaces had disappeared as a result of melting and the surfaces had been smoothed. A more even spherical shape was thus obtained, and the proportion of smooth beads was 95% or higher. Neither surface crack defects nor bead breakage both attributable to a thermal shock was observed. The internal void ratio was 5%. Furthermore, the beads were evaluated for wear characteristics and, as a result, the amount of zirconia was found to be 0.1 ppm, which was a detection limit.

The partially stabilized zirconia beads had an average particle diameter of 48 μm (standard deviation, 2.1 μm), a particle density of 6.08 g/cm$^3$, an average roundness of 1.8 μm, an average peak height of 0.39 μm, and an average number of peaks of 2.2. With respect to the surface roughness of the beads, the Ra and the Ry, both determined through an examination with a scanning laser microscope, were 0.02 μm and 0.16 μm, respectively, and the Ra(AFM), determined through an examination with an AFM, was 2.0 nm. Furthermore, the zirconia beads had a monoclinic-crystal content of 0%, and the monoclinic-crystal content thereof after the hydrothermal degradation test was 9%.

Example 3

The powder was supplied for 10 minutes under the same conditions as in Example 1, except that the nitrogen carrier gas 100 was introduced at 10 SLM. The flow rate of the carrier gas being ejected in this operation was estimated at 230 m/sec using equation (1). The partially stabilized zirconia beads obtained were taken out by filtration and dried.

The surfaces and sections of the partially stabilized zirconia beads obtained were examined with an SEM. As a result, it was found that most of the fine grains on the bead surfaces had disappeared as a result of melting and the surfaces had been smoothed. A more even spherical shape was thus obtained, and the proportion of smooth beads was 95% or higher. Neither surface crack defects nor bead breakage both attributable to a thermal shock was observed. The internal void ratio was 3%. Furthermore, the beads were evaluated for wear characteristics and, as a result, the amount of zirconia was found to be 0.1 ppm, which was a detection limit.

The partially stabilized zirconia beads had an average particle diameter of 48 μm (standard deviation, 3.4 μm), a particle density of 6.11 g/cm$^3$, an average roundness of 1.9 μm, an average peak height of 0.40 μm, and an average number of peaks of 2.0. With respect to the surface roughness of the beads, the Ra and the Ry, both determined through an examination with a scanning laser microscope, were 0.02 μm and 0.16 μm, respectively, and the Ra(AFM), determined through an examination with an AFM, was 2.2 nm. Furthermore, the zirconia beads had a monoclinic-crystal content of 0%, and the monoclinic-crystal content thereof after the hydrothermal degradation test was 10%.

Example 4

The powder was supplied for 10 minutes under the same conditions as in Example 1, except that the nitrogen carrier gas 100 was introduced at 15 SLM. The flow rate of the carrier gas being ejected in this operation was estimated at 350 m/sec using equation (1). The partially stabilized zirconia beads obtained were taken out by filtration and dried.

The surfaces and sections of the partially stabilized zirconia beads obtained were examined with an SEM. As a result, it was found that although particles which had remained unmelted were slightly observed, most of the fine grains on the bead surfaces had disappeared as a result of melting and the surfaces had been smoothed. A more even spherical shape was thus obtained, and the proportion of smooth beads was 90% or higher. Neither surface crack defects nor bead breakage both attributable to a thermal shock was observed. The internal void ratio was 2%. Furthermore, the beads were evaluated for wear characteristics using a batch bead mill and, as a result, the amount of zirconia was found to be 0.2 ppm.

The partially stabilized zirconia beads had an average particle diameter of 48 μm (standard deviation, 2.5 μm), a particle density of 6.12 g/cm$^3$, an average roundness of 1.9 μm, an average peak height of 0.40 μm, and an average number of peaks of 2.2. With respect to the surface roughness of the beads, the Ra and the Ry, both determined through an examination with a scanning laser microscope, were 0.03 μm and 0.20 μm, respectively, and the Ra(AFM), determined through an examination with an AFM, was 2.4 nm. Furthermore, the zirconia beads had a monoclinic-crystal content of 0%, and the monoclinic-crystal content thereof after the hydrothermal degradation test was 10%.

Example 5

The powder was supplied for 10 minutes under the same conditions as in Example 1, except that the nitrogen carrier gas 100 was introduced at 6 SLM and that the set temperature of the tubular electric furnace was changed to 600° C. The flow rate of the carrier gas being ejected in this operation was estimated at 100 msec using equation (1), and the discharge angle was 70°. The partially stabilized zirconia beads obtained were taken out by filtration and dried.

The surfaces and sections of the partially stabilized zirconia beads obtained were examined with an SEM. As a result, it was found that although particles which had remained unmelted were slightly observed, most of the fine grains on the bead surfaces had disappeared as a result of melting and the surfaces had been smoothed. A more even spherical shape was thus obtained, and the proportion of smooth beads was 90% or higher. Neither surface crack defects nor bead breakage both attributable to a thermal shock was observed. The internal void ratio was 5%. Furthermore, the beads were evaluated for wear characteristics and, as a result, the amount of zirconia was found to be 0.2 ppm.

The partially stabilized zirconia beads had an average particle diameter of 49 μm (standard deviation, 3.5 μm), a particle density of 6.08 g/cm$^3$, an average roundness of 1.8 μm, an average peak height of 0.39 μm, and an average number of peaks of 2.0. With respect to the surface roughness of the beads, the Ra and the Ry, both determined through an examination with a scanning laser microscope, were 0.03 μm and 0.20 μm, respectively, and the Ra(AFM), determined through an examination with an AFM, was 2.6 nm. Furthermore, the zirconia beads had a monoclinic-crystal content of 0%, and the monoclinic-crystal content thereof after the hydrothermal degradation test was 8%.

Example 6

The powder was supplied for 10 minutes under the same conditions as in Example 1, except that the nitrogen carrier gas 100 was introduced at 6 SLM and that the set temperature of the tubular electric furnace was changed to 400° C. The flow rate of the carrier gas being ejected in this operation was estimated at 70 m/sec using equation (1), and the discharge angle was 69°. The partially stabilized zirconia beads obtained were taken out by filtration and dried.

The surfaces and sections of the partially stabilized zirconia beads obtained were examined with an SEM. As a result, it was found that although particles which had remained unmelted were slightly observed, most of the fine grains on the bead surfaces had disappeared as a result of melting and the surfaces had been smoothed. A more even spherical shape was thus obtained, and the proportion of smooth beads was 80% or higher. Surface crack defects and bead breakage both attributable to a thermal shock were slightly observed. The internal void ratio was 10%. Furthermore, the beads were evaluated for wear characteristics and, as a result, the amount of zirconia was found to be 6 ppm.

The partially stabilized zirconia beads had an average particle diameter of 49 μm (standard deviation, 3.3 μm), a particle density of 6.05 g/cm$^3$, an average roundness of 1.9 μm, an average peak height of 0.46 µm, and an average number of peaks of 2.0. With respect to the surface roughness of the beads, the Ra and the Ry, both determined through an examination with a scanning laser microscope, were 0.04 µm and 0.25 µm, respectively, and the Ra(AFM), determined through an examination with an AFM, was 3.0 nm. Furthermore, the zirconia beads had a monoclinic-crystal content of 0%, and the monoclinic-crystal content thereof after the hydrothermal degradation test was 8%.

Example 7

The raw-material powder was supplied for 10 minutes under the same conditions as in Example 1, except that the argon gas 111 was ejected at 1.8 SLM, that the powder feed port 102 was disposed so that the distance 117 from the plasma generation position was 7 cm, and that the heated raw-material powder was conveyed to the powder feed port 102, introduced into the laminar-flow plasma 103 so as to cross the plasma 103, and thereby melted. The discharge angle of the resultant molten particles was 75°. The partially stabilized zirconia beads obtained were taken out by filtration and dried.

The surfaces and sections of the partially stabilized zirconia beads obtained were examined with an SEM. As a result, it was found that most of the fine grains on the bead surfaces had disappeared as a result of melting and the surfaces had been smoothed. A more even spherical shape was thus obtained, and the proportion of smooth beads was 99% or higher. Neither surface crack defects nor bead breakage both attributable to a thermal shock was observed. The internal void ratio was 1%. Furthermore, the beads were evaluated for wear characteristics and, as a result, the amount of zirconia was found to be 0.01 ppm.

The partially stabilized zirconia beads had an average particle diameter of 50 µm (standard deviation, 4.3 µm) and a particle density of 6.12 g/cm³. The beads had an average roundness of 1.7 µm, an average peak height of 0.35 µm, and an average number of peaks of 2.0. With respect to the surface roughness of the bead surfaces, the Ra and the Ry, both determined through an examination with a scanning laser microscope, were 0.01 µm and 0.10 µm, respectively, and the Ra(AFM), determined through an examination with an AFM, was 1.5 nm. Furthermore, the zirconia beads had a monoclinic-crystal content of 0%, and the monoclinic-crystal content thereof after the hydrothermal degradation test was 6%.

Figure 8:
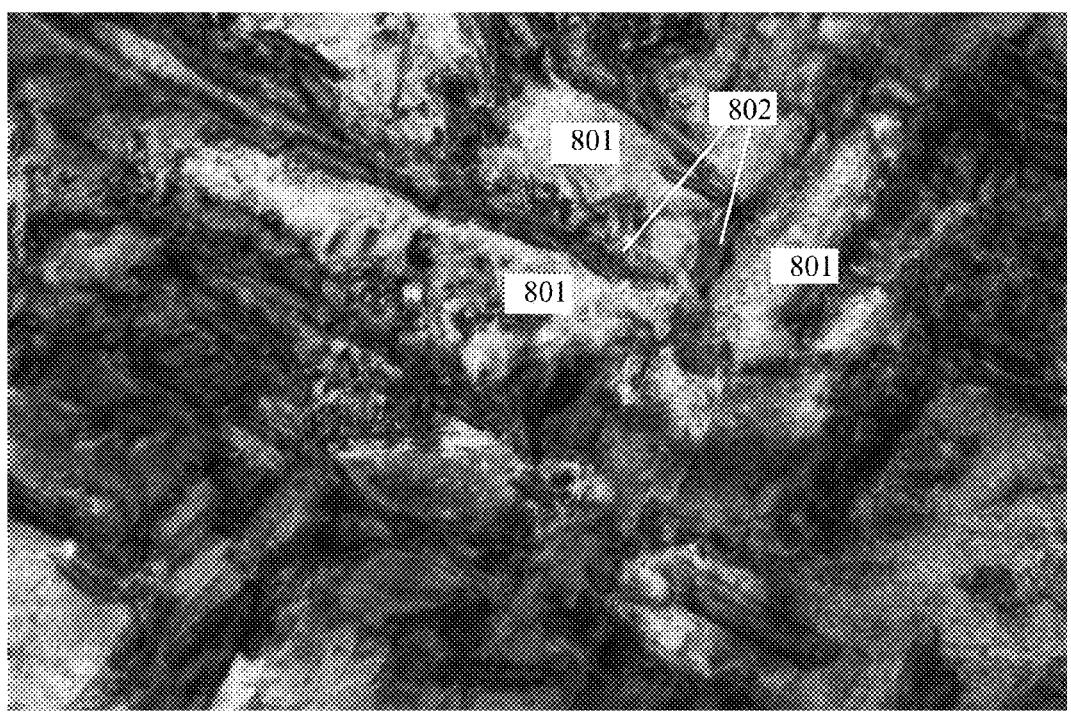
FIG. 8 is a view showing an example of a section of a bead.

A section of one of the zirconia beads obtained is shown in FIG. 8. The inside of the zirconia bead of the invention had a domain structure in which crystals were oriented in different directions. In FIG. 8, the bead had a structure composed of domains 801 gathered together so that the crystals were oriented in directions differing by 120 degrees. The black lines 802 each are a boundary between domains.

Example 8

The raw-material powder was supplied for 10 minutes under the same conditions as in Example 1, except that the argon gas 111 was ejected at 1.6 SLM, that the powder feed port 102 was disposed so that the distance 117 from the plasma generation position was 7 cm, and that the heated raw-material powder was conveyed to the powder feed port 102, introduced into the laminar-flow plasma 103 so as to cross the plasma 103, and thereby melted. The partially stabilized zirconia beads obtained were taken out by filtration and dried.

The surfaces and sections of the partially stabilized zirconia beads obtained were examined with an SEM. As a result, it was found that most of the fine grains on the bead surfaces had disappeared as a result of melting and the surfaces had been smoothed. A more even spherical shape was thus obtained, and the proportion of smooth beads was 98% or higher. Neither surface crack defects nor bead breakage both attributable to a thermal shock was observed. The internal void ratio was 1%. Furthermore, the beads were evaluated for wear characteristics and, as a result, the amount of zirconia was found to be 0.03 ppm.

The partially stabilized zirconia beads had an average particle diameter of 50 µm (standard deviation, 4.5 µm) and a particle density of 6.11 g/cm³. The beads had an average roundness of 1.7 µm, an average peak height of 0.35 µm, and an average number of peaks of 2.0. With respect to the surface roughness of the bead surfaces, the Ra and the Ry, both determined through an examination with a scanning laser microscope, were 0.01 µm and 0.10 µm, respectively, and the Ra(AFM), determined through an examination with an AFM, was 1.7 nm. Furthermore, the zirconia beads had a monoclinic-crystal content of 0%, and the monoclinic-crystal content thereof after the hydrothermal degradation test was 7%.

Comparative Example 1

The raw-material powder was supplied for 10 minutes under the same conditions as in Example 1, except that the nitrogen carrier gas 100 was introduced at 6 SLM and that the powder supplied had not been preheated. The raw-material powder introduced into the laminar-flow plasma 103 did not cross the plasma but was carried on the thermal plasma and then discharged therefrom, and the resultant molten powder as such was allowed to fall naturally. The flow rate of the carrier gas being ejected in this operation was estimated at 30 msec using equation (1), and the discharge angle was 58°. The partially stabilized zirconia beads obtained were taken out by filtration and dried.

Figure 6:
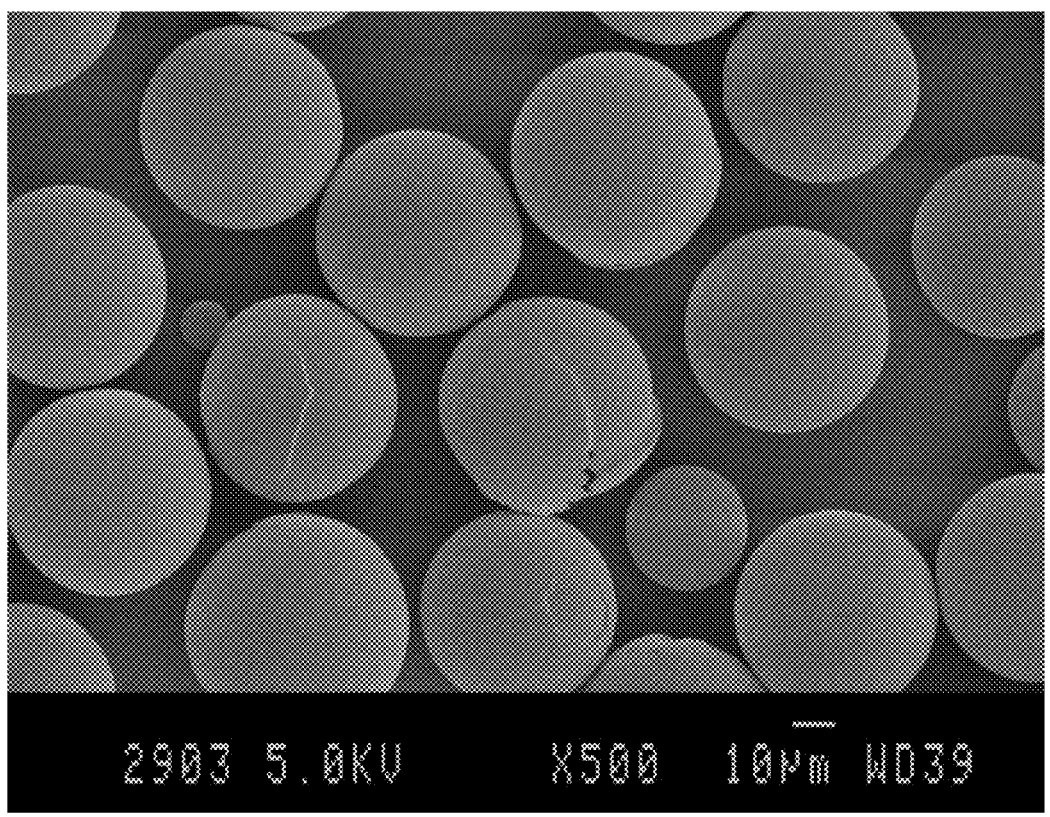
FIG. 6 is a view showing the partially stabilized zirconia beads produced in Comparative Example 1.

In FIG. 6 is shown an SEM image of some of the partially stabilized zirconia beads obtained through thermal spraying. The surfaces and sections of the beads obtained were examined with an SEM. As a result, it was found that about a half of fine grains on the bead surfaces had become invisible as a result of melting and the surfaces had been smoothed. The proportion of smooth beads was 50% or higher. The remainder had many cracks formed by a thermal shock resulting from abrupt heating, and included many particles which had expanded considerably and changed in diameter and many beads which had burst. The internal void ratio was 22%. Furthermore, the beads were evaluated for wear characteristics and, as a result, the amount of zirconia was found to be 32 ppm.

The partially stabilized zirconia beads had an average particle diameter of 51 µm (standard deviation, 4.0 µm), a particle density of 5.90 g/cm³, an average roundness of 1.9 µm, an average peak height of 0.42 µm, and an average number of peaks of 2.2. With respect to the surface roughness of the beads, the Ra and the Ry, both determined through an examination with a scanning laser microscope, were 0.05 µm and 0.42 µm, respectively, and the Ra(AFM), determined through an examination with an AFM, was 5.0 nm. The zirconia beads had a monoclinic-crystal content of 0%. However, the monoclinic-crystal content thereof after the hydrothermal degradation test had increased to 12%.

Comparative Example 2

The raw-material powder supplied was treated with a radio-frequency plasma.

The surfaces and sections of the beads obtained were examined with an SEM. As a result, it was found that about a half of fine grains on the bead surfaces had become invisible as a result of melting and the surfaces had been smoothed. The proportion of smooth beads was 60% or higher. The remainder had many cracks formed by a thermal shock resulting from abrupt heating, and included many particles which had expanded considerably and changed in diameter and beads which had burst. The internal void ratio was 15%. Furthermore, the beads were evaluated for wear characteristics and, as a result, the amount of zirconia was found to be 6 ppm.

The partially stabilized zirconia beads had an average particle diameter of 50 μm (standard deviation, 4.7 μm), a particle density of 6.05 g/cm$^3$, an average roundness of 2.0 μm, an average peak height of 0.42 μm, and an average number of peaks of 2.4. With respect to the surface roughness of the beads, the Ra and the Ry, both determined through an examination with a scanning laser microscope, were 0.04 μm and 0.29 μm, respectively, and the Ra(AFM), determined through an examination with an AFM, was 6.0 nm. Furthermore, the zirconia beads had a monoclinic-crystal content of 1%, and the monoclinic-crystal content thereof after the hydrothermal degradation test was 16%.

Comparative Example 3

The raw-material powder supplied was treated without passing the powder through a thermal plasma. The surfaces and sections of the beads were examined with an SEM. As a result, no smooth beads were observed. The internal void ratio was 1%. Furthermore, the beads were evaluated for wear characteristics and, as a result, the amount of zirconia was found to be 240 ppm.

The partially stabilized zirconia beads had an average particle diameter of 48 μm (standard deviation, 2.1 μm), a particle density of 6.05 g/cm$^3$, an average roundness of 2.3 μm, an average peak height of 0.43 μm, and an average number of peaks of 2.7. With respect to the surface roughness of the beads, the Ra and the Ry, both determined through an examination with a scanning laser microscope, were 0.05 μm and 0.41 μm, respectively, and the Ra(AFM), determined through an examination with an AFM, was 28.0 nm. The zirconia beads had a monoclinic-crystal content of 4%. However, the monoclinic-crystal content thereof after the hydrothermal degradation test was 26%.

The raw-material powder had a monoclinic-crystal content of 4%, whereas the zirconia beads of the invention had a monoclinic-crystal content of 0%. It was thus found that the monoclinic crystals which had been contained in the raw-material powder had disappeared in the zirconia beads of the invention.

Comparative Example 4

The raw-material powder was placed in a vessel and subjected to burnishing treatment without passing the powder through a thermal plasma. The surfaces and sections of the partially stabilized zirconia beads obtained were examined with an SEM. As a result, the surfaces of all particles were found to have been approximately evenly smoothed.

The internal void ratio was 1%. Furthermore, the beads were evaluated for wear characteristics and, as a result, the amount of zirconia was found to be 0.2 ppm.

The partially stabilized zirconia beads had an average particle diameter of 51 μm (standard deviation, 4.0 μm) and a particle density of 6.05 g/cm$^3$. The beads had an average roundness of 2.5 μm, an average peak height of 0.48 μm, and an average number of peaks of 2.8. With respect to the surface roughness of the bead surfaces, the Ra and the Ry, both determined through an examination with a scanning laser microscope, were 0.03 μm and 0.21 μm, respectively, and the Ra(AFM), determined through an examination with an AFM, was 4.0 nm. Furthermore, the zirconia beads had a monoclinic-crystal content of 1%, and the monoclinic-crystal content thereof after the hydrothermal degradation test was 7%.

The smoothing by burnishing treatment resulted in a small value of Ra determined with a laser microscope. However, the zirconia beads thus obtained had a large value of Ra(AFM), and the surfaces thereof had not been smoothed on the order of several nanometers.

The results obtained in Examples 1 to 8 and Comparative Examples 1 to 4 are summarized in Table 1.

TABLE 1

|  |  | Example 1 | Example 2 | Example 3 | Example 4 | Example 5 | Example 6 |
|---|---|---|---|---|---|---|---|
| Carrier gas amount | SLM | 6 | 4 | 10 | 15 | 6 | 6 |
| Preheating temperature | ° C. | 1000 | 1000 | 1000 | 1000 | 600 | 400 |
| Carrier gas flow rate | m/sec | 140 | 90 | 230 | 350 | 100 | 70 |
| Anode gas amount | SLM | 2.0 | 2.0 | 2.0 | 2.0 | 2.0 | 2.0 |
| Position of raw-material powder introduction | cm | 8 | 8 | 8 | 8 | 8 | 8 |
| Discharge angle | degrees | 72 | 71 | — | — | 70 | 69 |
| Proportion of smooth beads | % | ≥95 | ≥95 | ≥95 | ≥90 | ≥90 | ≥80 |
| Surface cracks or breakage |  | nil | nil | nil | nil | nil | present |
| Internal void ratio | % | 2 | 5 | 3 | 2 | 5 | 10 |
| Evaluation of wear characteristics (ICP value) | ppm | 0.1 | 0.1 | 0.1 | 0.2 | 0.2 | 6 |
| Average particle diameter | μm | 50 | 48 | 48 | 48 | 49 | 49 |
| Standard deviation of particle diameter | μm | 3.7 | 2.1 | 3.4 | 2.5 | 3.5 | 3.3 |
| Average roundness | μm | 1.7 | 1.8 | 1.9 | 1.9 | 1.8 | 1.9 |
| Average peak height | μm | 0.39 | 0.39 | 0.40 | 0.40 | 0.39 | 0.46 |
| Average number of peaks |  | 2.0 | 2.2 | 2.0 | 2.2 | 2.0 | 2.0 |
| Monoclinic-crystal content | % | 0 | 0 | 0 | 0 | 0 | 0 |

TABLE 1-continued

|  |  |  |  |  |  |  |  |
|---|---|---|---|---|---|---|---|
| Monoclinic-crystal content after hydrothermal test | % | 8 | 9 | 10 | 10 | 8 | 8 |
| Surface roughness Ra (scanning laser microscope) | μm | 0.02 | 0.02 | 0.02 | 0.03 | 0.03 | 0.04 |
| Surface roughness Ry (scanning laser microscope) | μm | 0.16 | 0.16 | 0.16 | 0.20 | 0.20 | 0.25 |
| Surface roughness Ra (AFM) | nm | 2.0 | 2.0 | 2.2 | 2.4 | 2.6 | 3.0 |
| Particle density | g/cm³ | 6.10 | 6.08 | 6.11 | 6.12 | 6.08 | 6.05 |

|  |  | Example 7 | Example 8 | Comparative Example 1 | Comparative Example 2 | Comparative Example 3 | Comparative Example 4 |
|---|---|---|---|---|---|---|---|
| Carrier gas amount | SLM | 6 | 6 | 6 | — | — | — |
| Preheating temperature | °C. | 1000 | 1000 | 20 | — | — | — |
| Carrier gas flow rate | m/sec | 140 | 140 | 30 | — | — | — |
| Anode gas amount | SLM | 1.8 | 1.6 | 2.0 | — | — | — |
| Position of raw-material powder introduction | cm | 7 | 7 | 8 | — | — | — |
| Discharge angle | degrees | 75 | — | 58 | — | — | — |
| Proportion of smooth beads | % | ≥99 | ≥98 | ≥50 | ≥60 | 0 | — |
| Surface cracks or breakage |  | nil | nil | many | many | nil | nil |
| Internal void ratio | % | 1 | 1 | 22 | 15 | 1 | 1 |
| Evaluation of wear characteristics (ICP value) | ppm | 0.01 | 0.03 | 32 | 6 | 240 | 0.2 |
| Average particle diameter | μm | 50 | 50 | 51 | 50 | 48 | 51 |
| Standard deviation of particle diameter | μm | 4.3 | 4.5 | 4.0 | 4.7 | 2.1 | 4.0 |
| Average roundness | μm | 1.7 | 1.7 | 1.9 | 2.0 | 2.3 | 2.5 |
| Average peak height | μm | 0.35 | 0.35 | 0.42 | 0.42 | 0.43 | 0.48 |
| Average number of peaks |  | 2.0 | 2.0 | 2.2 | 2.4 | 2.7 | 2.8 |
| Monoclinic-crystal content | % | 0 | 0 | 0 | 1 | 4 | 1 |
| Monoclinic-crystal content after hydrothermal test | % | 6 | 7 | 12 | 16 | 26 | 7 |
| Surface roughness Ra (scanning laser microscope) | μm | 0.01 | 0.01 | 0.05 | 0.04 | 0.05 | 0.03 |
| Surface roughness Ry (scanning laser microscope) | μm | 0.10 | 0.10 | 0.42 | 0.29 | 0.41 | 0.21 |
| Surface roughness Ra (AFM) | nm | 1.5 | 1.7 | 5.0 | 6.0 | 28.0 | 4.0 |
| Particle density | g/cm³ | 6.12 | 6.11 | 5.90 | 6.05 | 6.05 | 6.05 |

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 11, 2008 (Application No. 2008-316211), a Japanese patent application filed on Feb. 10, 2009 (Application No. 2009-028151), and a Japanese patent application filed on Aug. 31, 2009 (Application No. 2009-199874), the contents thereof being incorporated herein by reference.

INDUSTRIAL APPLICABILITY

The process for ceramic bead production of the invention can provide ceramic beads which are usable in applications where strength and wear resistance are necessary, such as, for example, pulverization media for use in the mixing and/or disaggregation of fine ceramic powders. Consequently, the invention has a remarkable industrial value.

DESCRIPTION OF THE REFERENCE NUMERALS

100: Carrier gas
101: Powder feeder
102: Powder feed port
103: Laminar-flow thermal plasma
104: Powder with molten surface
105: Furnace
106: Collection vessel
107: Water (pure water)
108: Smoothed ceramic bead
109: Argon gas
110: Plasma gas
111: Argon gas
112: Cathode
113: Auxiliary cathode
114: Anode
115: Power supply
116: Auxiliary power supply
117: Plasma melting distance
118: Refractory tube
701: Thermal plasma
702: Discharge angle
801: Domain
802: Boundary between domains

The invention claimed is:

1. Zirconia beads characterized by having a surface roughness (Ra) as measured with an AFM (atomic force microscope) of 3.0 nm or less and having an internal void ratio of 10% or less.

2. The zirconia beads as claimed in claim 1, characterized by having a monoclinic-crystal content less than 1% and a surface roughness (Ry) as measured with a scanning laser microscope of 0.3 μm or less.

3. The zirconia beads as claimed in claim 1, characterized by having a monoclinic-crystal content of 10% or less after having been treated at 130-135° C. and a relative humidity of 100% for 12 hours.

4. The zirconia beads as claimed in claim 1, characterized by having an average roundness of particle diameter of 2.0 μm or less.

5. The zirconia beads as claimed in claim 1, characterized in that the average peak height from a complete circle calculated from the roundness and a least-square center is 0.4 μm or less and the average number of peaks observed above the complete circle is 2.2 or less.

* * * * *